(12) United States Patent
Park et al.

(10) Patent No.: US 12,591,228 B2
(45) Date of Patent: Mar. 31, 2026

(54) SYSTEM FOR ADJUSTING GAP STEP AND METHOD OF OPERATING SAME

(71) Applicants:Hyundai Motor Company, Seoul (KR); Kia Corporation, Seoul (KR)

(72) Inventors: Chul Woo Park, Ulsan (KR); Jae Ho Shin, Ulsan (KR); Kang Hyeon Jo, Jeongeup-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 449 days.

(21) Appl. No.: 18/191,130

(22) Filed: Mar. 28, 2023

(65) Prior Publication Data

US 2024/0184276 A1 Jun. 6, 2024

(30) Foreign Application Priority Data

Dec. 2, 2022 (KR) ........................ 10-2022-0166905

(51) Int. Cl.
*G05B 19/418* (2006.01)
*B62D 65/00* (2006.01)

(52) U.S. Cl.
CPC ....... *G05B 19/41875* (2013.01); *B62D 65/00* (2013.01); *G05B 2219/40039* (2013.01)

(58) Field of Classification Search
CPC ............... G05B 19/402; G05B 19/418; G05B 19/4187; B25J 9/00; B25J 25/00; B60R 11/04; G01B 11/32
USPC ........................................................ 700/110
See application file for complete search history.

(56) References Cited

U.S. PATENT DOCUMENTS

| | | | | |
|---|---|---|---|---|
| 5,067,250 A | * | 11/1991 | Auweiler | ............... G01B 7/002 |
| | | | | 33/783 |
| 5,090,105 A | * | 2/1992 | DeRees | ................ B62D 63/025 |
| | | | | 29/469 |
| 8,322,762 B2 | * | 12/2012 | Watson | ................... E05F 7/005 |
| | | | | 292/342 |
| 8,373,763 B2 | | 2/2013 | Zhang et al. | |
| 9,651,934 B2 | * | 5/2017 | Lee | .......................... B23P 19/06 |
| 10,875,592 B2 | * | 12/2020 | Damoulis | ............. B62D 65/005 |
| 11,597,091 B2 | * | 3/2023 | Lawrence | ............. G01S 7/4972 |

(Continued)

FOREIGN PATENT DOCUMENTS

| | | | | |
|---|---|---|---|---|
| CN | 108858191 A | * | 11/2018 | ............. B62D 65/06 |
| CN | 115519551 A | * | 12/2022 | ........... B62D 65/024 |

(Continued)

*Primary Examiner* — Ronald D Hartman, Jr.
(74) *Attorney, Agent, or Firm* — SLATER MATSIL, LLP

(57) ABSTRACT

An embodiment system for adjusting a gap step includes a process device configured to mount a first moving part and a second moving part, a first information obtaining device including a camera, and a control device configured to control the process device based on a first driving control value such that the first moving part and the second moving part are mounted on a first vehicle body, obtain a first image of the first vehicle body on which the first moving part and the second moving part are mounted, obtain the gap step for the first moving part, the second moving part, or both through the first image, and mount the first moving part and the second moving part on a second vehicle body by controlling the process device based on a second driving control value corresponding to the gap step.

20 Claims, 11 Drawing Sheets

(56)                   References Cited

U.S. PATENT DOCUMENTS

| | | | | |
|---|---|---|---|---|
| 11,953,310 | B2 * | 4/2024 | Belda Pla ............ | B62D 65/005 |
| 12,145,747 | B2 * | 11/2024 | Okada .................... | B23P 21/00 |
| 2005/0008469 | A1 * | 1/2005 | Jung ................... | B25J 15/0052 |
| | | | | 414/729 |
| 2005/0017057 | A1 * | 1/2005 | Motomi ................. | B23K 11/11 |
| | | | | 228/212 |
| 2011/0087360 | A1 * | 4/2011 | Chen .................... | B25J 9/1697 |
| | | | | 700/114 |
| 2012/0265341 | A1 | 10/2012 | Trompeter | |
| 2012/0283874 | A1 | 11/2012 | Trompeter | |
| 2017/0043477 | A1 | 2/2017 | Kitayama et al. | |
| 2018/0313380 | A1 * | 11/2018 | Cox ................... | B60R 13/0206 |

FOREIGN PATENT DOCUMENTS

| | | | | | |
|---|---|---|---|---|---|
| EP | 0320315 | A1 * | 6/1989 | ............. | B62D 65/02 |
| EP | 2423639 | B1 * | 3/2013 | ............. | G01B 11/14 |
| JP | 5082895 | B2 | 11/2012 | | |
| JP | 5365218 | B2 | 12/2013 | | |
| JP | 2017035754 | A | 2/2017 | | |
| KR | 20060097017 | A * | 9/2006 | ............ | B62D 65/06 |
| KR | 100759067 | B1 | 9/2007 | | |
| KR | 100867773 | B1 | 11/2008 | | |
| KR | 20130141664 | A | 12/2013 | | |
| KR | 20210102566 | A * | 8/2021 | ........... | G01B 5/0002 |
| WO | WO-2021255445 | A2 * | 12/2021 | ....... | G05B 19/41895 |

* cited by examiner

200

15

210

16

220

212

15

16

310

| | WHEN PARALLEL-MOVING -1.0 | | WHEN ROTATING PART IS MOVED BY -1.0 | | | | WHEN STEP IS MOVED BY -1.0 | |
|---|---|---|---|---|---|---|---|---|
| | UNIT GAP CHANGE | UNIT STEP CHANGE | UNIT GAP CHANGE | | UNIT STEP CHAN | | UNIT GAP CHANGE | UNIT STEP CHAN |
| | | | GAP OF ROTATING PART | GAP OF FIXED SHAFT | STEP OF ROTATING PART | STEP OF FIXED SHAFT | | |
| | 0.87 | 0.10 | 0.70 | 0.20 | 0.70 | -0.40 | 0.40 | -0.80 |

320

| CLASSIFICATION CORRECTION FLOW / ADMINISTRATION | DRIVING CONTROL VALUE | MEASUREMENT VALUE | 1-TH STEP-1 | 1-TH STEP-2 | 1-TH STEP-3 | 2-TH STEP-1 | 2-TH STEP-2 | 2-TH STEP-3 |
|---|---|---|---|---|---|---|---|---|
| (movement / administration) | | | T PARALLEL MOVEMENT / 2GAP ADMINISTRATION | ROTATIONAL MOVEMENT / 1,2GAP ADMINISTRATION | L PARALLEL MOVEMENT / 1,2STEP ADMINISTRATION | T PARALLEL MOVEMENT / 2GAP ADMINISTRATION | ROTATIONAL MOVEMENT / 1,2GAP ADMINISTRATION | L PARALLEL MOVEMENT / 1,2STEP ADMINISTRATION |
| (driving value) | | | -1.13 | 1.00 | 0.50 | 1.75 | -0.71 | -0.07 |
| 1 GAP | 6.30 | 5.80 | 4.90 | ② 5.60 | 5.90 | 7.30 | ⑤ 6.80 | 6.76 |
| 2 GAP | 5.90 | 6.80 | ① 5.90 | 4.80 | 4.50 | ④ 5.90 | 6.69 | 6.71 |
| 1 STEP | -6.90 | -6.50 | -6.74 | -6.64 | ③ -7.14 | -6.77 | -6.84 | ⑥ -6.77 |
| 2 STEP | -7.30 | -7.70 | -7.94 | -8.04 | -7.54 | -7.17 | -7.10 | -7.17 |

| CLASSIFICATION | 3-TH STEP-1 | 3-TH STEP-2 | 3-TH STEP-3 | 4-TH STEP-1 | 4-TH STEP-2 | 4-TH STEP-3 |
|---|---|---|---|---|---|---|
| (movement / administration) | T PARALLEL MOVEMENT / 2GAP ADMINISTRATION | ROTATIONAL MOVEMENT / 1,2GAP ADMINISTRATION | L PARALLEL MOVEMENT / 1,2STEP ADMINISTRATION | T PARALLEL MOVEMENT / 2GAP ADMINISTRATION | ROTATIONAL MOVEMENT / 1,2GAP ADMINISTRATION | T PARALLEL MOVEMENT / 1,2STEP ADMINISTRATION |
| (driving value) | -1.04 | 0.27 | 0.03 | 0.38 | -0.10 | -0.01 |
| 1 GAP | 5.93 | ⑧ 6.11 | 6.13 | 6.44 | ⑪ 6.37 | 6.36 |
| 2 GAP | ⑦ 5.90 | 5.61 | 5.52 | ⑩ 5.90 | 6.01 | 6.01 |
| 1 STEP | -6.99 | -6.96 | ⑨ -6.99 | -6.91 | -6.92 | ⑫ -6.91 |
| 2 STEP | -7.39 | -7.41 | -7.39 | -7.31 | -7.30 | -7.31 |

FIG. 3A 301                                                    303

—— CURRENT LOCATION
---- TARGET LOCATION

410

START

OBTAIN VEHICLE TYPE INFORMATION ∼510

CONTROL DRIVING DEVICE BASED ON FIRST DRIVING
CONTROL VALUE CORRESPONDING TO VEHICLE TYPE ∼520

OBTAIN IMAGE OF FIRST VEHICLE BODY BASED ON
MEASUREMENT LOCATION CORRESPONDING TO VEHICLE TYPE ∼530

END

SYSTEM FOR ADJUSTING GAP STEP AND METHOD OF OPERATING SAME

CROSS-REFERENCE TO RELATED APPLICATIONS

This application claims the benefit of Korean Patent Application No. 10-2022-0166905, filed on Dec. 2, 2022, which application is hereby incorporated herein by reference.

TECHNICAL FIELD

The present disclosure relates to a system for adjusting a gap step and a method of operating the same.

BACKGROUND

In general, a vehicle is produced through a production process in which numerous devices and parts are assembled until it is released as a finished product.

For example, the production process is largely divided into a press process, a vehicle body assembly process, a painting process, and an assembly process. The press process is a process of pressing main parts of a vehicle with a mold and cutting and extruding steel plates, and the vehicle body assembly process is a process of assembling and welding a vehicle body by assembling main parts manufactured in the press process. In addition, the painting process is a process of applying soundproofing, dustproofing, anti-corrosive treatment, and color painting to the manufactured car body, and the assembling process is a process of assembling other parts such as a seat, a bumper, and an engine to the painted vehicle body.

SUMMARY

The present disclosure relates to a system for adjusting a gap step and a method of operating the same. Particular embodiments relate to a system for adjusting a gap step that adjusts the gap step for a moving part in a state in which a vehicle body assembly process is completed and a method of operating the same.

Embodiments of the present disclosure can solve problems occurring in the prior art while advantages achieved by the prior art are maintained intact.

In the above-described vehicle body assembly process, various types of moving parts such as a front door, a rear door, a hood, and a trunk lid, as well as a side outer and a roof panel, may be mounted on a vehicle body. Such moving parts may be sequentially mounted on the vehicle body in a specified order.

In this case, a gap step (e.g., a gap and/or step difference) is inevitably formed between moving parts mounted on a vehicle body or between the moving parts and the vehicle body. Such a gap step is directly connected to the appearance quality index felt by consumers, so it is necessary to thoroughly secure quality.

In general, a gap step may be adjusted in a process of mounting each moving part. For example, the gap step for the moving part mounted in each process may be periodically measured, and when the gap step does not satisfy a specified reference range, the gap step may be adjusted while repeating an operation of adjusting the assembly location of a mounting jig.

However, even though a moving part is mounted on a vehicle body while maintaining a gap step that satisfies a reference range specified for each process, due to part distribution or process distribution, a gap step may be generated even when a vehicle body assembly process is completed, that is, in a state in which all moving parts are mounted before the painting process.

Therefore, an embodiment of the present disclosure provides a system for adjusting a gap step capable of improving the quality of a vehicle while reducing time and cost required for quality management by adjusting the gap step in a state in which a vehicle body assembly process is completed, and a method of operating the same.

The technical problems solvable by embodiments of the present disclosure are not limited to the aforementioned problems, and any other technical problems not mentioned herein will be clearly understood from the following description by those skilled in the art to which the present disclosure pertains.

According to an embodiment of the present disclosure, a system for adjusting a gap step includes a process device that mounts a first moving part and a second moving part, a first information obtaining device including a camera, and a control device that controls the process device and the first information obtaining device, wherein the control device may control the process device based on a first driving control value such that the first moving part and the second moving part are mounted on a first vehicle body, obtain a first image of the first vehicle body on which the first moving part and the second moving part are mounted, obtain a gap step for the first moving part, the second moving part, or a combination thereof through the first image, and mount the first moving part and the second moving part on a second vehicle body by controlling the process device based on a second driving control value corresponding to the gap step.

According to various embodiments, the system may further include a second information obtaining device that obtains vehicle type information of the first vehicle body, wherein the control device may control the process device with the first driving control value corresponding to vehicle type information obtained through the second information obtaining device, and the vehicle type information may include at least one of model information, specification information, production date information, production order information, or a combination thereof.

According to various embodiments, the control device may obtain the first image based on a measurement location corresponding to the vehicle type information.

According to various embodiments, the process device may include a first process device that mounts the first moving part on the first vehicle body introduced thereto, and a second process device that mounts the second moving part on the first vehicle body discharged through the first process device, wherein the control device may obtain the first image of the first vehicle body discharged through the second process device.

According to various embodiments, the control device may estimate a gap step for the second vehicle body based on the second driving control value, obtain a gap step for the first moving part, the second moving part, or a combination thereof through a second image of the second vehicle body discharged from the process device, and verify accuracy of the second driving control value based on the estimated gap step and the obtained gap step.

According to various embodiments, the control device may control the process device based on a third driving control value corresponding to the gap step obtained through the second image when a difference between the estimated gap step and the obtained gap step exceeds a specified range.

According to various embodiments, the control device may notify an external device of a result of comparing the estimated gap step and the obtained gap step when the difference between the estimated gap step and the obtained gap step exceeds a specified range.

According to various embodiments, the first information obtaining device may obtain an image and depth information of at least a partial region of the first vehicle body.

According to various embodiments, the first driving control value may correspond to a mounting state of the first moving part and the second moving part in which the gap step does not occur, wherein the second driving control value may correspond to a state in which the first moving part and the second moving part are to be mounted in order to adjust a gap step generated while the first moving part and the second moving part are mounted.

According to various embodiments, the control device may obtain the second driving control value based on an algorithm that repeats at least parallel and rotational movements of the first moving part or the second moving part identified through the first image.

According to another embodiment of the present disclosure, a method of operating a system for adjusting a gap step includes controlling a process device based on a first driving control value such that a first moving part and a second moving part are mounted on a first vehicle body, obtaining a first image of the first vehicle body on which the first moving part and the second moving part are mounted, obtaining a gap step for the first moving part, the second moving part, or a combination thereof through the first image, and mounting the first moving part and the second moving part on a second vehicle body by controlling the process device based on a second driving control value corresponding to the gap step.

According to various embodiments, the controlling of the process device may include obtaining vehicle type information of the first vehicle body and controlling the process device based on the first driving control value corresponding to the obtained vehicle type information, wherein the vehicle type information may include at least one of model information, specification information, production date information, production order information, or a combination thereof.

According to various embodiments, the obtaining of the first image may include obtaining the first image based on a measurement location corresponding to the vehicle type information.

According to various embodiments, the obtaining of the first image may include mounting the first moving part on the first vehicle body introduced into a first process device, mounting the second moving part on the first vehicle body discharged through the first process device and introduced into a second process device, and obtaining the first image of the first vehicle body discharged through the second process device.

According to various embodiments, the method may further include estimating a gap step for the second vehicle body based on the second driving control value, obtaining a gap step for the first moving part, the second moving part, or a combination thereof through a second image of the second vehicle body discharged from the process device, and verifying accuracy of the second driving control value based on the estimated gap step and the obtained gap step.

According to various embodiments, the verifying of the accuracy may further include controlling the process device based on a third driving control value corresponding to the gap step obtained through the second image when a difference between the estimated gap step and the obtained gap step exceeds a specified range.

According to various embodiments, the verifying of the accuracy may further include notifying an external device of a result of comparing the estimated gap step and the obtained gap step when the difference between the estimated gap step and the obtained gap step exceeds a specified range.

According to various embodiments, the first image may include an image and depth information of at least a partial region of the first vehicle body.

According to various embodiments, the first driving control value may correspond to a mounting state of the first moving part and the second moving part in which the gap step does not occur, and the second driving control value may correspond to a state in which the first moving part and the second moving part are to be mounted in order to adjust a gap step generated while the first moving part and the second moving part are mounted.

According to various embodiments, the second driving control value may be obtained based on an algorithm that repeats at least parallel and rotational movements of the first moving part or the second moving part identified through the first image.

BRIEF DESCRIPTION OF THE DRAWINGS

The above and other objects, features and advantages of embodiments of the present disclosure will be more apparent from the following detailed description taken in conjunction with the accompanying drawings, in which:

FIGS. 3A to 3C are diagrams illustrating an operation of obtaining a driving control value in a control device according to various embodiments of the present disclosure;

DETAILED DESCRIPTION OF ILLUSTRATIVE EMBODIMENTS

Figure 1A:
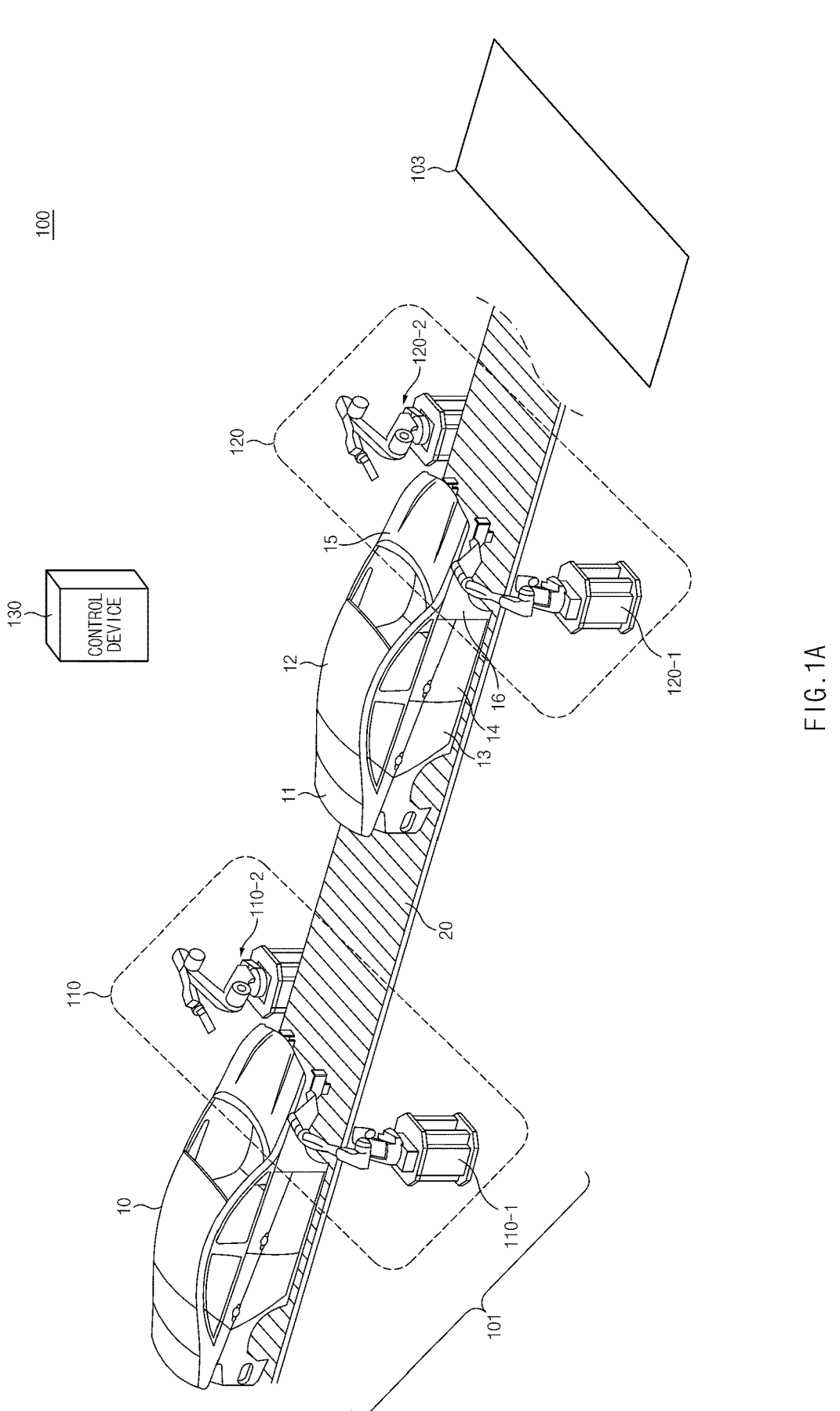
FIG. 1A is a diagram schematically illustrating a configuration of a gap step adjustment system according to various embodiments of the present disclosure.

Hereinafter, some embodiments of the present disclosure will be described in detail with reference to the exemplary drawings. In adding the reference numerals to the components of each drawing, it should be noted that the identical or equivalent component is designated by the identical numeral even when it is displayed on other drawings. Further, in describing the embodiments of the present disclosure, a detailed description of the related known configuration or function will be omitted when it is determined that it interferes with the understanding of the embodiments of the present disclosure.

In describing the components of the embodiments according to the present disclosure, terms such as first, second, A, B, (a), (b), and the like may be used. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1B:
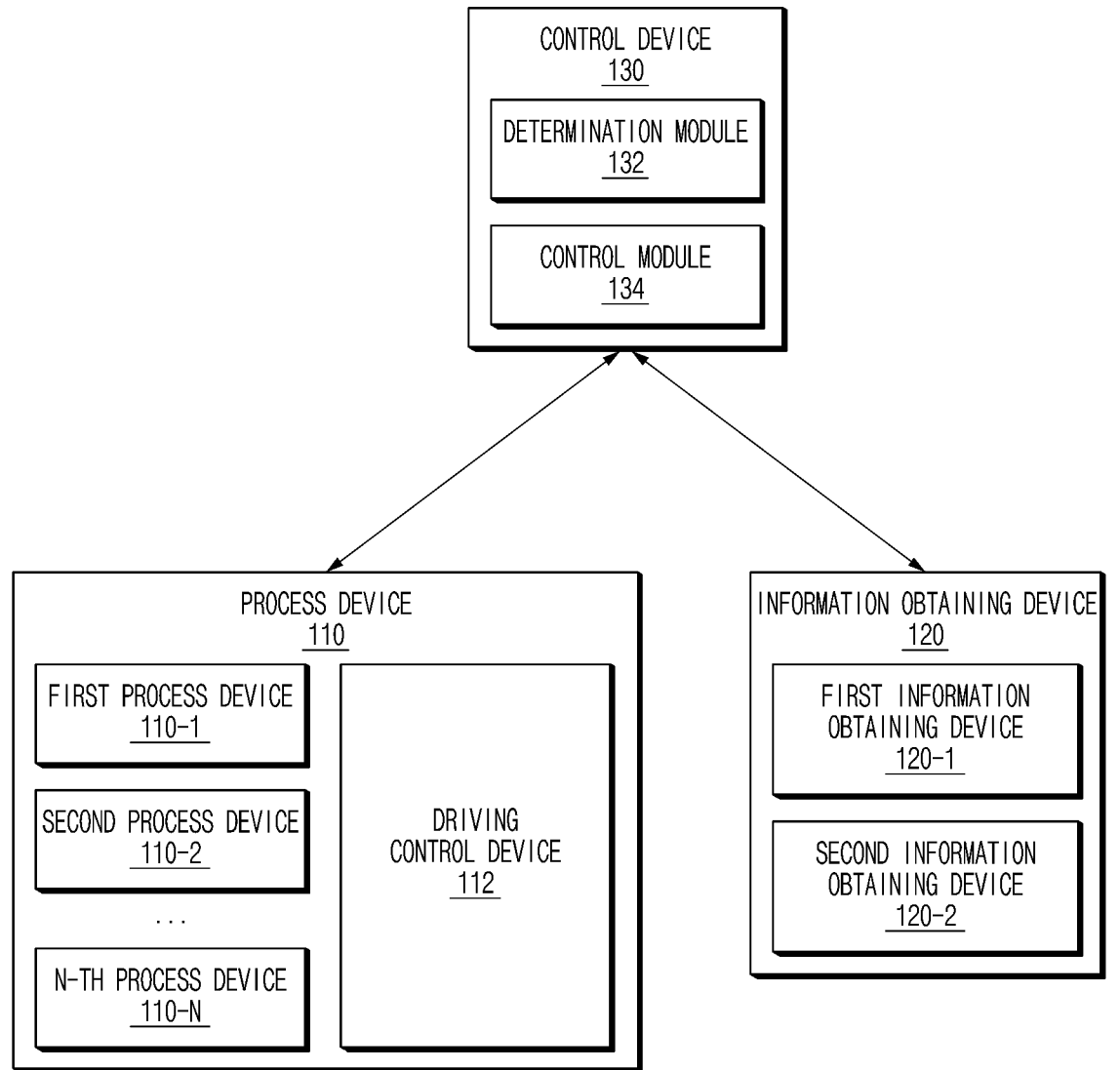
FIG. 1B is a block diagram illustrating each configuration of a system for adjusting a gap step according to various embodiments of the present disclosure.
Figure 2A:
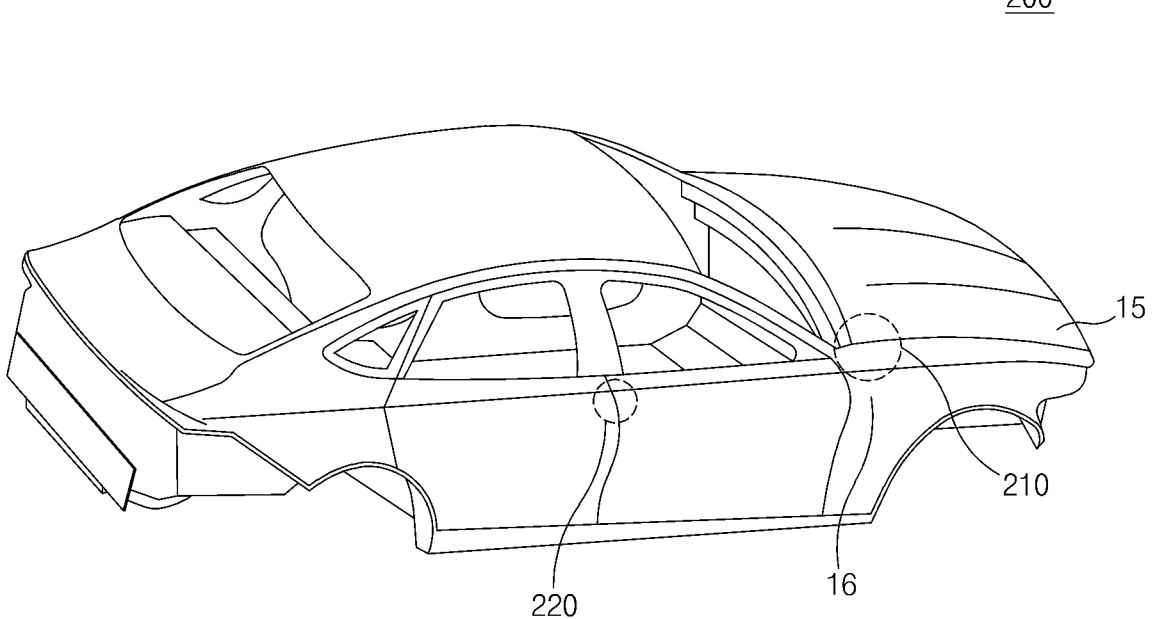
FIGS. 2A to 2C are diagrams illustrating an operation of checking a gap step in a control device according to various embodiments of the present disclosure.
Figure 2B:
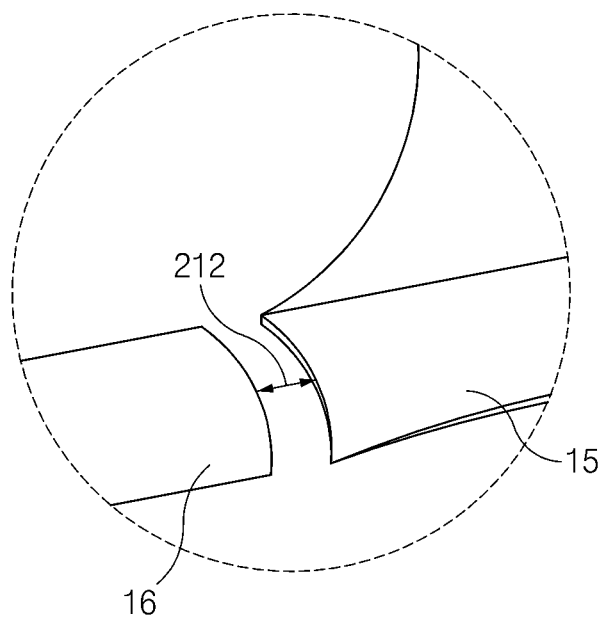
Figure 2C:
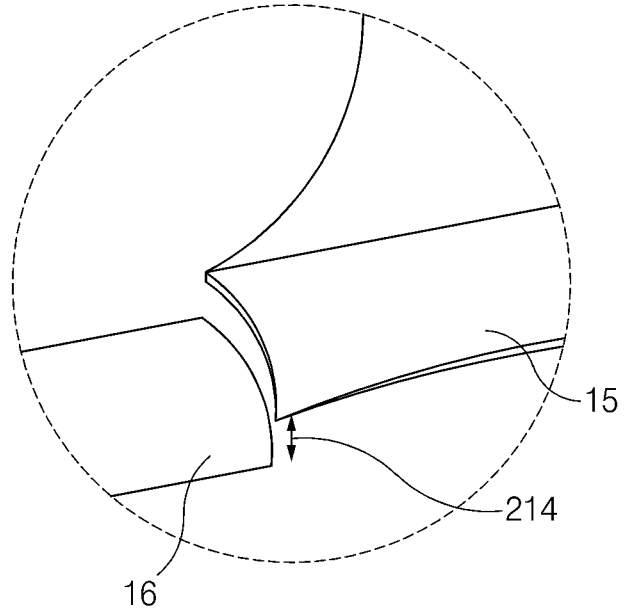
Figure 3B:
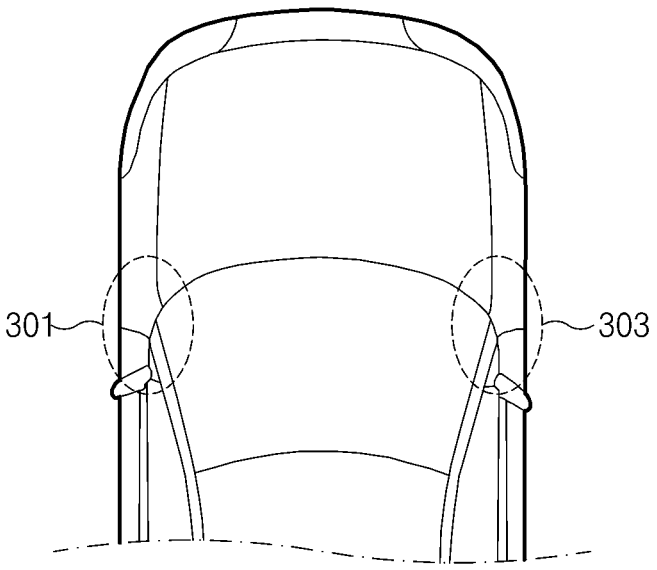
Figure 3C:
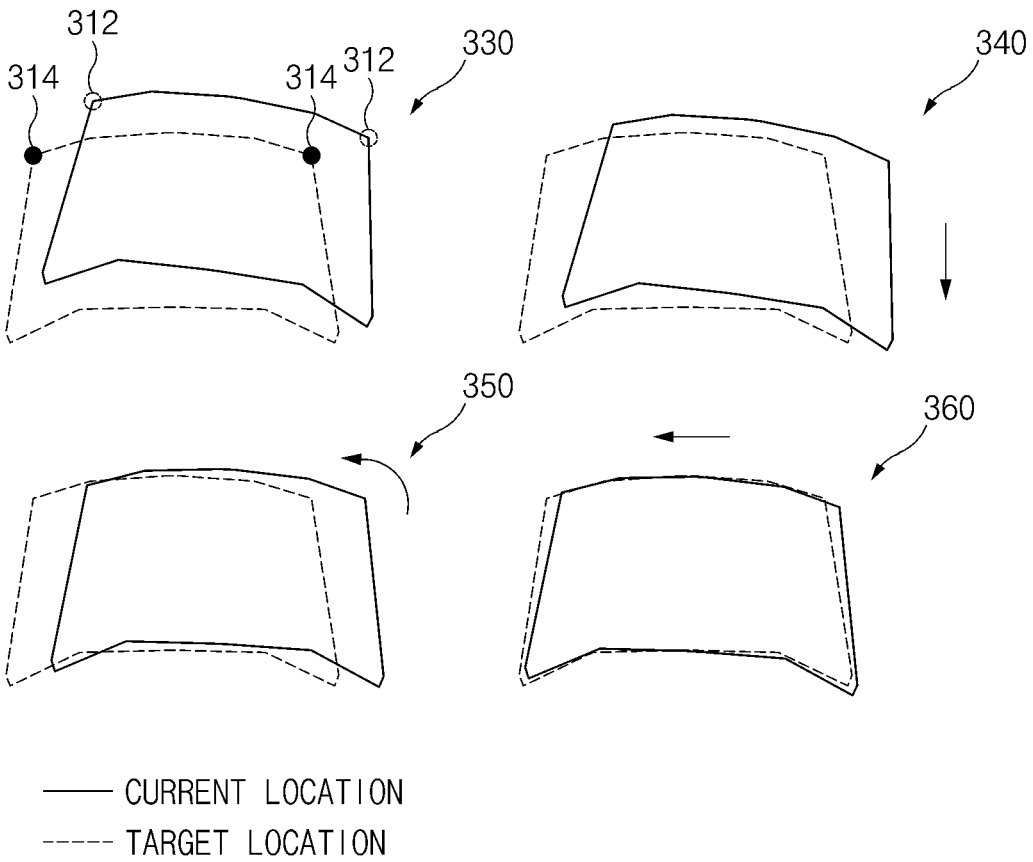

FIG. 1A is a diagram schematically illustrating a configuration of a gap step adjustment system according to various embodiments of the present disclosure. FIG. 1B is a block diagram illustrating each configuration of a system for adjusting a gap step according to various embodiments of the present disclosure. FIGS. 2A to 2C are diagrams illustrating an operation of checking a gap step in a control device according to various embodiments of the present disclosure. FIGS. 3A to 3C are diagrams illustrating an operation of obtaining a driving control value in a control device according to various embodiments of the present disclosure.

Referring to FIGS. 1A to 3C, a system 100 for adjusting a gap step according to various embodiments may include a process device (or a vehicle body assembly process device) 110, an information obtaining device 120, and a control device 130.

According to various embodiments, the system 100 for adjusting a gap step may adjust a gap step (e.g., a gap and/or a step difference) of a moving part in a state in which a vehicle body assembly process 101 is completed. According to an embodiment, in the vehicle body assembly process 101, various types of moving parts such as a trunk lid (or tailgate) 11, a rear door 13, a front door 14, a hood 15, and the like, as well as a roof panel 12, a side outer 16, and the like may be mounted on a vehicle body (or a body frame) 10 (e.g., a body in white). For example, the vehicle body 10 may be moved along a transfer line 20 in a state of being loaded into a transfer unit (not shown) and go through a step-by-step process of mounting each moving part. The system 100 for adjusting a gap step may adjust a gap step with respect to the vehicle body 10 on which a moving part is mounted.

According to various embodiments, the process device 110 may be configured to mount a moving part on the vehicle body 10. The process device 110 may pick and take out moving parts loaded in a loading box (e.g., a pallet) at specified time intervals, and mount them on the vehicle body 10. For example, the process device 110 may include a mounting jig or an articulated mounting robot (e.g., a 7-axis articulated mounting robot), or may include a combination of a mounting jig and a mounting robot.

According to various embodiments, as shown in FIG. 1B, the process device 110 may include a plurality of process devices (e.g., a first process device 110-1, a second process device 110-2, and an n-th process device 110-n) and a driving control device 112. Each of the process devices 110-1, 110-2, and 110-n may include a driving device (e.g., a servo motor) capable of adjusting the position, direction, angle, and the like of each of the process devices 110-1, 110-2, and 110-n. In addition, driving of each process device 110-1, 110-2, and 110-n (or driving units) may be controlled by the driving control device 112. For example, the driving control device 112 may control each driving device such that the moving part is mounted on the vehicle body 10 to be in a specified mounting state (e.g., a mounting position, a mounting direction, a mounting angle, and the like).

According to various embodiments, the vehicle body assembly process 101 may include a plurality of processes for mounting a moving part. For example, the moving part may be mounted on the vehicle body 10 through various processes such as a door mounting process (e.g., a front/rear door mounting process), a hood mounting process, a trunk lid mounting process, a tailgate mounting process, and the like.

In this regard, one or more process devices 110 may be disposed for each process. For example, a door mounting process (e.g., a front door mounting process and a rear door mounting process) may include the first process device 110-1 for mounting a right door and the second process device 110-2 for mounting a left door. In addition, one process device 110-1 may be provided for at least one of the hood mounting process, the trunk lid mounting process, and the tailgate mounting process. In addition, at least one process device 110-1 may be disposed to process at least two processes (e.g., a right front door mounting process and a right rear door mounting process).

According to various embodiments, the information obtaining device 120 may obtain information about the vehicle body assembly process 101. The information obtaining device 120 may include one or more first information obtaining devices 120-1 configured to obtain first information about the vehicle body 10 discharged through the process device 110. The first information may include at least one image used to analyze the gap step of a moving part.

According to various embodiments, the first information obtaining device 120-1 may obtain an image of at least a part of the vehicle body 10, which is discharged after the moving part is mounted through the vehicle body assembly process 101.

For example, the first information obtaining device 120-1 may obtain an image of the vehicle body 10 on which the moving part is mounted whenever the moving part is mounted. In this regard, the first information obtaining device 120-1 may be arranged between the first process of mounting a first moving part (e.g., a trunk lid 11 (or a tail gate)) and a second process of mounting a moving part (e.g., a rear door 13).

As another example, the first information obtaining device 120-1 may obtain an image of the vehicle body 10 discharged after all moving parts (e.g., the trunk lid 11 (or a tail gate), the rear door 13, the front door 14, the hood 15, and the like) are mounted by passing through the vehicle body assembly process 101. In this regard, the first information obtaining device 120-1 may be arranged between the vehicle body assembly process 101 and a painting process 103.

According to an embodiment, the first information obtaining device 120-1 may include a camera (e.g., a 3D vision camera) configured to obtain depth information of a moving part mounted on the vehicle body 10. For example, the first information obtaining device 120-1 may be arranged on a part (e.g., a front arm) of an articulated robot (e.g., a 7-axis articulated robot), and may be moved to a specified location (e.g., a location where the moving part is mounted) by the articulated robot to obtain an image and depth information on the entire area of the vehicle body 10 or a partial area of the vehicle body 10 to which the moving part is mounted.

Additionally or selectively, the information obtaining device 120 may include at least one second information obtaining device 120-2 configured to obtain second information about the vehicle body 10. The second information may include vehicle type information on the vehicle body 10. For example, the vehicle type information may include at least one of model information, specification information, production date information, production order information, or a combination thereof.

According to an embodiment, the second information obtaining device 120-2 may obtain second information by recognizing a tag (e.g., an RFID tag) assigned to a transport unit that loads the vehicle body 10 and moves it along the transfer line 20. In this regard, the second information obtaining device 120-2 may include a reader (e.g., an RFID reader) configured to recognize a tag using a radio frequency.

However, this is only exemplary, and various embodiments are not limited thereto. For example, the second information obtaining device 120-2 may be configured to obtain an image of the vehicle body 10. The image obtained by the second information obtaining device 120-2 may be used to recognize the vehicle type information on the vehicle body 10. In this case, the first information obtaining device 120-1 and the second information obtaining device 120-2 may be separated from each other as shown, but they may be integrated into one configuration.

According to various embodiments, the control device 130 may control the operation of the process device 110. The operation control of the process device 110 may include adjusting (e.g., correcting) a mounting state (e.g., a mounting position, a mounting direction, a mounting angle, and the like) of the moving part on the vehicle body 10. For example, the control device 130 may be a portable communication device (e.g., a smart phone) or a computer device, and the control device 130 according to various embodiments is not limited thereto.

According to an embodiment, the control device 130 generates a first driving control value for each of the process devices 110-1, 110-2, and 110-n corresponding to the first mounting state, and the first driving control value may be provided to each of the process devices 110-1, 110-2, and 110-n. The first mounting state may be a mounting state of the moving part in which a gap step does not occur. Accordingly, the driving control device 112 may control each of the process devices 110-1, 110-2, and 110-n based on the first driving control value. For example, the control device 130 may generate the first driving control value at a time point when the vehicle body assembly process 101 starts.

To the contrary, when the process device 110 (e.g., the driving control device 112) includes a function of generating a driving control value, the control device 130 may provide information on a target location to the process device 110. In this case, the driving control device 112 may generate a first driving control value for each of the process devices 110-1, 110-2, and 110-n corresponding to the target location, and control each of the process devices 110-1, 110-2, and 110-n based on the first driving control value.

According to various embodiments, the control device 130 may analyze the first information obtained by the first information obtaining device 120-1 while the process device 110 (or each of the process devices 110-1, 110-2, and 110-n) is controlled based on the first driving control value and may confirm the gap step for the moving part. For example, the first information may be an entire or partial image 200 of the vehicle body 10 shown in FIG. 2A. In this regard, the control device 130 may analyze the image of a first part 210 of the vehicle body 10 and confirm the gap step (e.g., a gap 212 of FIG. 2B and/or a step difference 214 of FIG. 2C) between the first moving part 15 (e.g., hood) and the side outer 16. In addition, the control device 130 may analyze the image of a second part 220 of the vehicle body 10 and confirm the gap step between the second moving part (e.g., the front door 14) and the third moving part (e.g., the rear door 13).

As described above, in confirming the gap step, the control device 130 may convert depth information about the vehicle body 10 obtained as the first information into plane information (e.g., plane coordinates). In addition, the control device 130 may confirm the gap step based on a location of a first inflection point in the image changing from a first straight section corresponding to a first part (e.g., the hood 15) to a curve and a location of a second inflection point in the image changing from a second straight section corresponding to a second part (e.g., the side outer 16) to a curve, based on the converted plane information. However, this is only exemplary, and various embodiments are not limited thereto. For example, the control device 130 according to various embodiments may confirm the gap step by using various known schemes.

According to various embodiments, the control device 130 may determine whether driving control for the process device 110 is necessary based on the gap step identified through image analysis. For example, the control device 130 may determine whether it is necessary to change the mounting state of the moving part from the first mounting state to the second mounting state. The second mounting state may be a state in which the moving part is to be mounted (or corrected) in order to adjust the gap step caused due to part distribution or process distribution.

According to an embodiment, the control device 130 may determine that driving control for adjusting the gap step is necessary when the gap step confirmed through image analysis is out of a specified range. In addition, the control device 130 may determine that driving control for adjusting the gap step is unnecessary when the gap step confirmed through image analysis is in the specified range.

According to various embodiments, when it is determined that driving control is necessary, the control device 130 may generate the second driving control value. The second driving control value may be a control value for the process device 110 for mounting the moving part in the second mounting state.

According to an embodiment, the control device 130 may generate the second driving control value based on a predefined gap step change table. The gap step change table may be a table in which change amounts of a gap step according to a parallel control amount, a horizontal control amount, and a rotation control amount of the process device 110 are defined. For example, as shown in reference numeral 310 of FIG. 3A, a gap change amount (e.g., 0.87), a step change amount (e.g., 0.1), and the like, which are estimated when the process device 110 is moved in a first parallel movement (e.g., −1.0), may be defined through the gap step change table.

In order to expatiate on the above-described operation of generating the second driving control value, as shown in FIG. 3B, it may be assumed that the first gap step for a first region 301 and the second gap step for a second region 303 between the first moving part (e.g., the hood 15) and the side outer 16 are adjusted.

In this case, as shown in FIG. 3C, the control device 130 may perform an algorithm of repeating operations of a first parallel movement (e.g., X-axis parallel movement) 330, a second parallel movement (e.g., Y-axis parallel movement) 340, and a rotational movement 350 of the first moving part based on a reference point (e.g., a tooling hole 312 formed in the moving part or a tooling hole 314 formed in the vehicle body 10) of the first moving part, in which a gap step occurs. In addition, the control device 130 may generate the second driving control value based on the control amount of the first moving part controlled until the current location of the first moving part moved by the above-described algorithm becomes substantially the same as the target location. In this case, the target location may be a mounting location of the first moving part where no gap step occurs.

According to an embodiment, the moving part may be mounted on the vehicle body 10 through the tooling hole 312. The tooling hole 312 may be formed in at least the moving part and/or the vehicle body 10, and the gap step of the moving part may vary depending on the gap step of the tooling hole 312. In addition, due to the gap step of the tooling hole 312, the amount of movement of the moving part and the amount of change in the gap step of the moving part according to the amount of movement may not be the same. Accordingly, the control device 130 according to various embodiments performs an algorithm that repeats at least one of the first parallel movement 330, the second parallel movement 340, or the rotational movement 350, thereby generating the second driving control value.

For example, a specific generating operation of the second driving control value may be described with reference to FIGS. 3A and 3B.

First, like operation ①, the control device 130 may move the first moving part (or the process device 110) in parallel with the first axis (e.g., T parallel movement) by –1.13 to converge the measured value (e.g., 6.80) of the gap (e.g., a second gap) with respect to the second region 303 to the management value (e.g., 5.90). Accordingly, the measured value of the gap (e.g., the first gap) for the first region 301 may be changed from 5.8 to 4.9, and the measured value of the step (e.g., the first step) for the first region 301 may be changed from –6.5 to –6.74. In addition, the measured value of the gap (e.g., the second gap) for the second region 303 may be changed from 6.8 to 5.9, and the step for the second region 303 (e.g., the second step) may be changed from –7.7 to –7.94.

Then, like operation ②, the control device 130 may rotate the first moving part (or the process device 110) clockwise by 1.0 to converge the measured value (e.g., 4.90) of the gap (e.g., the first gap) for the first region 301 changed by operation ① to a management value (e.g., 6.30). Accordingly, the measured value of the gap (e.g., the first gap) for the first region 301 may be changed from 4.9 to 5.6, and the step (e.g., the first step) for the first region 301 may be changed from –6.74 to –6.64. In addition, the gap (e.g., the second gap) for the second region 303 may be changed from 5.9 to 4.8, and the step (e.g., the second step) for the second region 303 may be changed from –7.94 to –8.04.

Then, like operation ③, the control device 130 may converge the measured value (e.g., –6.64) of the step (e.g., the first step) for the first region 301 changed by operation ② to a management value (e.g., –6.9). In addition, the control device 130 may move the first moving part (or the process device 110) in parallel with the second axis (e.g., L parallel movement) by 0.5 to converge the measured value (e.g., –8.04) of the gap (e.g., a second gap) with respect to the second region 303 to the management value (e.g., –7.3).

Accordingly, the measured value of the gap (e.g., the first gap) for the first region 301 may be changed from 5.6 to 5.9, and the step (e.g., the first step) for the first region 301 may be changed from –6.64 to –7.14. In addition, the gap (e.g., the second gap) for the second region 303 may be changed from 4.8 to 4.5, and the step (e.g., the second step) for the second region 303 may be changed from –8.04 to –7.54.

Through the above operations, when the gap steps for the first region 301 and the second region 303 converge to the management values, the control device 130 may generate the second driving control value based on the control amount of the first moving part controlled while performing operations ① to ③.

Meanwhile, through the above operations, when the gap steps for the first region 301 and the second region 303 do not converge to the management values, the control device 130 may additionally perform operations ④ to ⑥. In this case, when the gap steps for the first region 301 and the second region 303 converge to the management values, the control device 130 may generate the second driving control value based on the control amount of the first moving part controlled while performing operations ① to ⑥.

In addition, when the gap steps for the first region 301 and the second region 303 do not converge to the management values even through the operations ④ to ⑥, the control device 130 may additionally perform operations ⑦ to ⑨ or operations ⑦ to ⑫.

According to various embodiments, the control device 130 may also control the operation of the information obtaining device 120. The operation of the information obtaining device 120 may include instructing acquisition of first information necessary for confirming a gap step. In this case, the acquisition location (e.g., the photographing location) of the first information may vary depending on the vehicle type. Accordingly, the control device 130 may determine the acquisition location of the first information about the vehicle body 10 based on the second information obtained from the second information obtaining device 120-2 and provide the acquisition location to the first information obtaining device 120-1.

At least some of the operations of the control device 130 described above may be performed whenever a moving part is mounted on the vehicle body 10. For example, the control device 130 may first generate the second driving control value based on the image of the vehicle body 10 obtained in a state where the first moving part (e.g., the trunk lid 11 (or tail gate)) is mounted on the vehicle body 10 and may adjust the gap step associated with the first moving part. In addition, the control device 130 may generate continuously and additionally the second driving control value based on the image of the vehicle body 10 (e.g., the vehicle body 10 on which the first moving part and the second moving part are mounted) obtained in a state where the second moving part is mounted on the vehicle body 10 and may adjust the gap step associated with the second moving part.

In addition, at least some of the operations of the above-described control device 130 may be performed when at least two or more moving parts are mounted on the vehicle body 10. For example, the control device 130 may generate the second driving control value based on the image of the vehicle body 10 obtained in a state where all moving parts that may be mounted on the vehicle body 10 are mounted and may adjust the gap step of each moving part. In this case, the gap step may be quickly corrected compared to the operation of adjusting the gap step every time a moving part is mounted on the vehicle body 10, thus the number of times of obtaining the image of the vehicle body 10 is relatively reduced. In addition, when the gap step is adjusted every time the moving part is mounted on the vehicle body 10, a situation in which an image acquisition location (e.g., a photographing location) deviates from a reference location may occur due to repeated image acquisition operations. However, when the gap step is adjusted when at least two or more moving parts are mounted on a vehicle body, correction performance may be improved by preventing a situation in which an image acquisition location deviates from a reference location from occurring.

In relation to the control device 130 described above, in FIG. 1B, a determination module 132 and a control module 134 are shown as a configuration of the control device 130. This is to help explain various embodiments, and the above-described operation of the control device 130 may be performed by the determination module 132 and the control module 134. For example, the determination module 132 may perform an operation of confirming a gap step through image analysis and an operation of determining whether driving control for the process device 110 is necessary based on the gap step as described above. In addition, the control module 134 may perform an operation of generating the first driving control value and the second driving control value for the process device 110 and an operation of determining an acquisition location of the first information.

In addition, the configuration of the system 100 for adjusting a gap step described above is only exemplary, and various embodiments are not limited thereto. For example, at least one of the above-described components may be excluded from the configuration of the system 100 for adjusting a gap step. To the contrary, other configurations other than the above-described configuration may be added as the configuration of the system 100 for adjusting a gap step. In addition, some of the above-described components may be integrated with other components.

Hereinafter, a method of operating the system 100 for adjusting a gap step according to various embodiments will be described in detail with reference to FIGS. 4 to 6.

Figure 4:
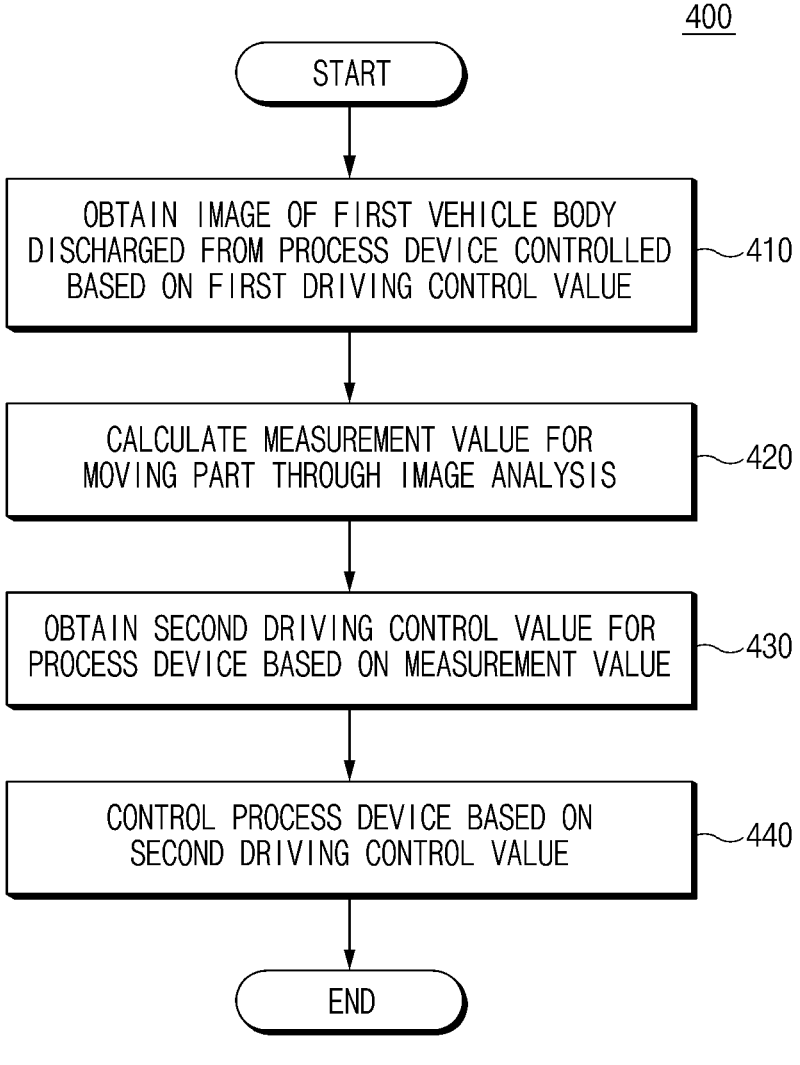
FIG. 4 is a flowchart illustrating an operation of a system for adjusting a gap step according to various embodiments of the present disclosure.

FIG. 4 is a flowchart illustrating an operation of a system for adjusting a gap step according to various embodiments. Each operation in the following embodiment may be performed sequentially, but is not necessarily performed sequentially. For example, the order of each operation may be changed, or at least two operations may be performed in parallel. In addition, at least one of the following operations may be omitted according to an embodiment.

Referring to FIG. 4, in operation 410, the system 100 for adjusting a gap step (or the control device 130) according to various embodiments may obtain an image of the first vehicle body discharged from the process device 110 controlled based on the first driving control value. The first driving control value may correspond to a mounting state of the moving part in which a gap step does not occur. In addition, the first vehicle body may be a vehicle body before being introduced into the painting process 103 after a moving part is mounted through the vehicle body assembly process 101.

According to an embodiment, the system 100 for adjusting a gap step may control the information obtaining device 120 (or the first information obtaining device 120-1) to obtain the first vehicle body. For example, it is possible to obtain an image including depth information of the first vehicle body.

According to various embodiments, in operation 420, the system 100 for adjusting a gap step (or the control device 130) may calculate the first measurement value for the moving part through image analysis. The first measurement value may be a measurement value for a gap and/or step difference generated between moving parts mounted on the first vehicle body or between the first vehicle body and the moving part.

According to an embodiment, when calculating the first measurement value, the system 100 for adjusting a gap step may convert depth information about the first vehicle body into plane information (e.g., plane coordinates).

According to various embodiments, in operation 430, the system 100 for adjusting a gap step (or the control device 130) may obtain the second driving control value for the process device 110 based on the first measurement value. The second driving control value may correspond to a state in which the moving part is to be mounted in order to adjust the gap step caused by part distribution or process distribution. According to an embodiment, the system 100 for adjusting a gap step may use the gap step change table in which the change amounts of a gap step according to a parallel control amount, a horizontal control amount, and a rotation control amount of the process device 110 are predefined. For example, as described with reference to FIG. 3C, the system 100 for adjusting a gap step may obtain the second driving control value by performing an algorithm of repeating operations of a first parallel movement (e.g., X-axis parallel movement) 330, a second parallel movement 340 (e.g., Y-axis parallel movement), and a rotational movement 350 of the moving part based on a reference point (e.g., the tooling hole 312 formed in the moving part or the tooling hole 314 formed in the vehicle body 10) of the moving part, in which a gap step occurs.

According to various embodiments, in operation 440, the system for adjusting a gap level (or the control device 130) may control the process device 110 based on the second driving control value. Accordingly, the second vehicle body discharged through the process device 110 controlled based on the second driving control value may be in an adjusted state.

Figure 5:
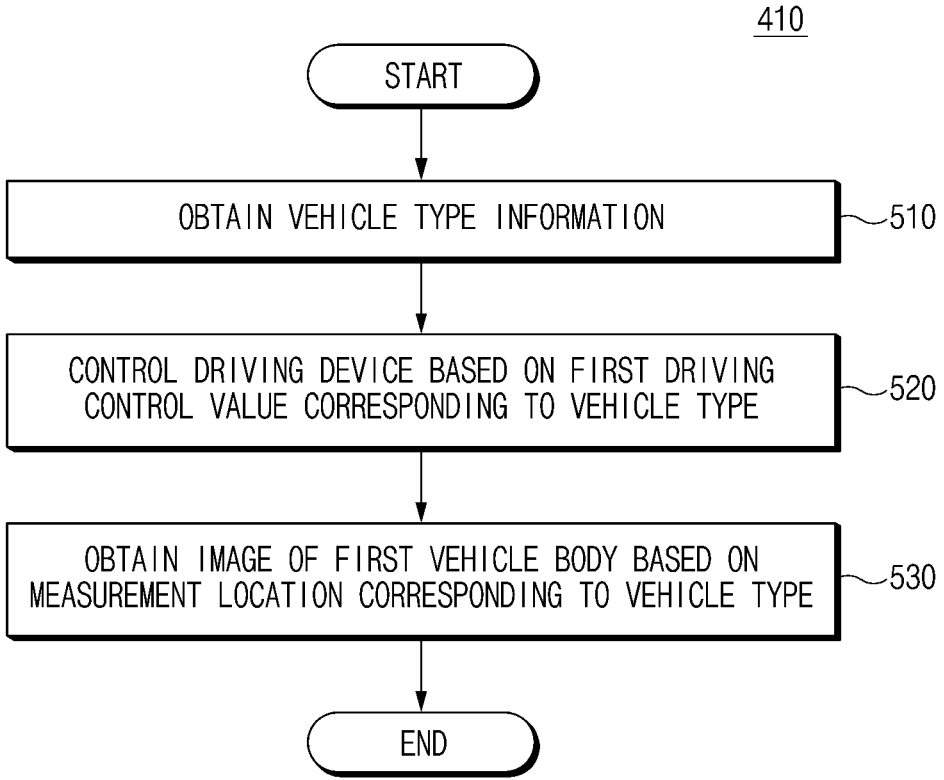
FIG. 5 is a flowchart illustrating an operation of obtaining an image of a first vehicle body in a system for adjusting a gap step according to various embodiments of the present disclosure.

FIG. 5 is a flowchart illustrating an operation of obtaining an image of a first vehicle body in a system for adjusting a gap step according to various embodiments.

Operations of FIG. 5 described below may represent various embodiments of operation 410 of FIG. 4. Each operation in the following embodiment may be performed sequentially, but is not necessarily performed sequentially. For example, the order of each operation may be changed, or at least two operations may be performed in parallel. In addition, at least one of the following operations may be omitted according to an embodiment.

Referring to FIG. 5, the system 100 for adjusting a gap step (or the control device 130) according to various embodiments may obtain vehicle type information of the first vehicle body in operation 510. The vehicle type information may include at least one of model information, specification information, production date information, production order information, or a combination thereof. According to an embodiment, the system 100 for adjusting a gap step may obtain vehicle type information by controlling the information obtaining device 120 (or the second information obtaining device 120-2).

According to various embodiments, in operation 520, the system 100 for adjusting a gap step (or the control device 130) may obtain the first driving control value corresponding to the vehicle type and, based on the first driving control value, control the process device 110. For example, the mounting state of the moving part may be different for each vehicle type. Accordingly, the system 100 for adjusting a gap step may store the first driving control value for each vehicle type in advance and obtain the first driving control value corresponding to a vehicle body introduced into the vehicle body assembly process 101.

According to various embodiments, in operation 530, the system 100 for adjusting a gap step (or the control device 130) may obtain the image of the first vehicle body based on the measurement location corresponding to the vehicle type. For example, the location of the image used to measure the gap step may be different for each vehicle type. Accordingly, the system 100 for adjusting a gap step may store the measurement location for each vehicle type in advance and obtain the measurement location corresponding to the vehicle body introduced into the vehicle body assembly process 101.

Figure 6:
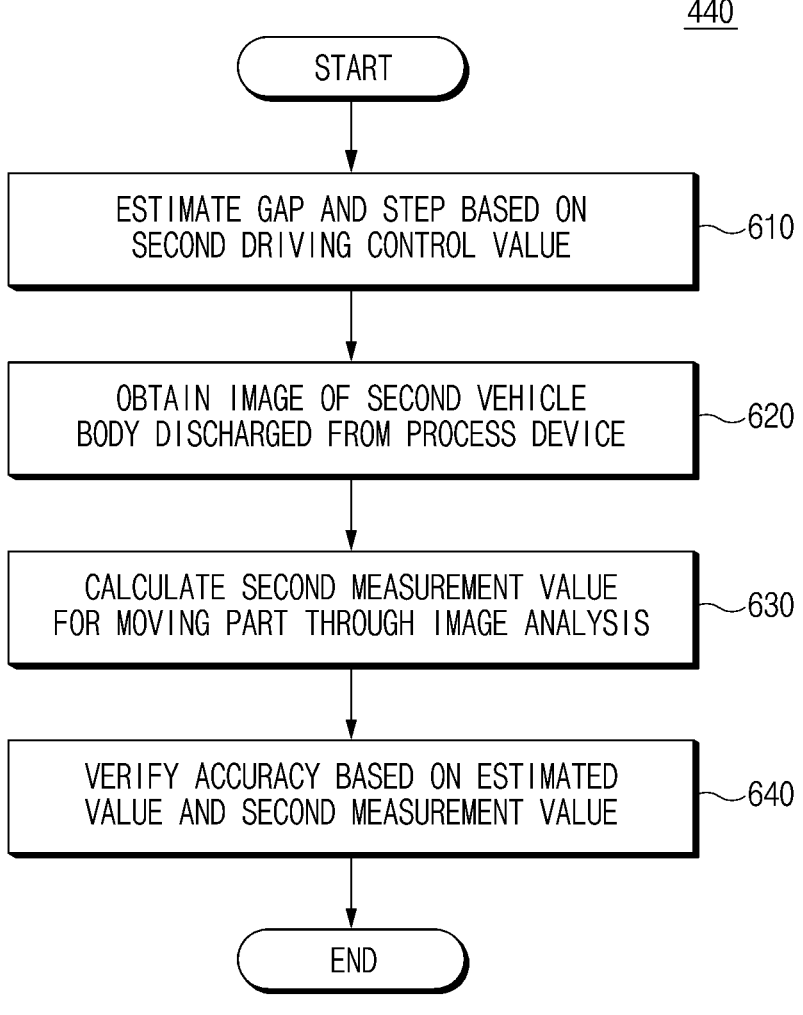
FIG. 6 is a flowchart illustrating an operation of verifying accuracy of a gap step adjustment in a system for adjusting a gap step according to various embodiments of the present disclosure.

FIG. 6 is a flowchart illustrating an operation of verifying accuracy of a gap step adjustment in a system for adjusting a gap step according to various embodiments.

Operations of FIG. 6 described below may represent various embodiments of operation 440 of FIG. 4. Each operation in the following embodiment may be performed sequentially, but is not necessarily performed sequentially. For example, the order of each operation may be changed, or at least two operations may be performed in parallel. In addition, at least one of the following operations may be omitted according to an embodiment.

Referring to FIG. 6, the system 100 for adjusting a gap step (or the control device 130) according to various embodiments may estimate the gap step based on the second driving control value in operation 610. According to an embodiment, the system 100 for adjusting a gap step may estimate the gap step generated in the second vehicle body when the process device 110 is controlled based on the second driving control value. In this regard, the system 100 for adjusting a gap step may confirm the amount of change in the gap step according to the second driving control value by using a predefined gap step change table.

According to various embodiments, in operation 620, the system for adjusting a gap step (or the control device 130) may obtain an image of the second vehicle body discharged from the process device 110. The second vehicle body may be a vehicle body that is introduced into the process device 110 controlled based on the second driving control value and then discharged with a moving part mounted thereon.

According to various embodiments, in operation 630, the system for adjusting a gap step (or the control device 130) may calculate the second measurement value for the moving part through image analysis. The second measurement value may be a measurement value for a gap and/or step difference corrected by the second driving control value.

According to various embodiments, in operation 640, the system for adjusting a gap step (or the control device 130) may verify the accuracy of the gap step adjustment based on the estimated value and the second measurement value. According to an embodiment, the system for adjusting a gap step may determine that the gap step adjustment is normally performed when the difference between the estimated value and the second measurement value is in a specified range. According to another embodiment, the system 100 for adjusting a gap step may determine that the gap step adjustment is abnormally performed when the difference between the estimated value and the second measurement value is not in a specified range. In this regard, the system 100 for adjusting a gap step may perform an operation of adjusting a gap step based on the third driving control value. For example, the third driving control value may be a driving control value that is recalculated to adjust a gap step caused due to component distribution or process distribution. For example, when the gap step is not normally adjusted based on the second driving control value, the system 100 adjusting a gap step may obtain the image of the second vehicle body and perform an operation of calculating the third driving control value through image analysis. As another example, the first driving control value corresponding to the mounting state of the moving part in which the gap step does not occur may be provided as the third driving control value. In addition, the system 100 for adjusting a gap step may notify an operator of a result of comparing the estimated value and the second measured value through an external device, thereby allowing the operator to adjust the gap step.

Various embodiments of the disclosure and terms used herein are not intended to limit the technologies described in the disclosure to specific embodiments, and it should be understood that the embodiments and the terms include modifications, equivalents, and/or alternatives of the corresponding embodiments described herein. It may be understood that a singular form of a noun corresponding to an item in the present disclosure includes one or more of the things, unless the relevant context clearly indicates otherwise. In embodiments of the disclosure, at least one of A (e.g., model information), B (e.g., specification information), C (e.g., production date information), D (e.g., production order information), or a combination thereof may include at least one of A, B, C, D, AB, AC, AD, BC, BD, CD, ABC, ABD, ACD, or ABCD.

The system for adjusting a gap step according to various embodiments of the present disclosure may improve the quality of a vehicle while reducing time and cost required for quality control by adjusting the gap step in a state in which a body assembly process is completed.

Effects obtained by various embodiments of the present disclosure may not be limited to the above.

Although exemplary embodiments of the present disclosure have been described for illustrative purposes, those skilled in the art will appreciate that various modifications, additions and substitutions are possible, without departing from the scope and spirit of the disclosure.

Therefore, the exemplary embodiments disclosed in the present disclosure are provided for the sake of descriptions, not limiting the technical concepts of the present disclosure, and it should be understood that such exemplary embodiments are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. A system for adjusting a gap step, the system comprising:

a process device configured to mount a first moving part and a second moving part;

a first information obtaining device comprising a camera; and a control device configured to:

control the process device based on a first driving control value such that the first moving part and the second moving part are mounted on a first vehicle body;

obtain a first image of the first vehicle body on which the first moving part and the second moving part are mounted;

obtain the gap step for the first moving part, the second moving part, or both, based on the first image;

mount the first moving part and the second moving part on a second vehicle body by controlling the process device based on a second driving control value corresponding to the gap step;

calculate a first measurement value for the first moving part and the second moving part through image analysis;

convert depth information about the first vehicle body into plane information, when calculating the first measurement value;

obtain the second driving control value for the process device based on the first measurement value; and calculate a second measurement value for the first moving part and the second moving part through image analysis, wherein:

the first measurement value corresponds to a gap step difference generated between the first moving part and the second moving part mounted on the first vehicle body, the second measurement value corresponds to the gap step difference corrected by the second driving control value, the first vehicle body is a vehicle body before being introduced into a painting process after the first moving part and the second moving part are mounted through a vehicle body assembly process, and the second vehicle body is the vehicle body that is introduced into the process device controlled based on the second driving control value.

2. The system of claim 1, further comprising:

a second information obtaining device configured to obtain vehicle type information of the first vehicle body, wherein:

the vehicle type information comprises model information, specification information, production date information, or production order information, and the control device is further configured to control the process device with the first driving control value corresponding to vehicle type information obtained through the second information obtaining device.

3. The system of claim 2, wherein the control device is further configured to obtain the first image based on a measurement location corresponding to the vehicle type information.

4. The system of claim 1, wherein the process device comprises:

a first process device configured to mount the first moving part on the first vehicle body introduced thereto; and a second process device configured to mount the second moving part on the first vehicle body discharged through the first process device, wherein the control device is further configured to obtain the first image of the first vehicle body discharged through the second process device.

5. The system of claim 1, wherein the control device is further configured to:

estimate the gap step for the second vehicle body based on the second driving control value;

obtain the gap step for the first moving part, the second moving part, or both through a second image of the second vehicle body discharged from the process device; and verify accuracy of the second driving control value based on the estimated gap step and the obtained gap step.

6. The system of claim 5, wherein the control device is further configured to control the process device based on a third driving control value corresponding to the gap step obtained through the second image in response to a difference between the estimated gap step and the obtained gap step exceeding a specified range.

7. The system of claim 5, wherein the control device is further configured to notify an external device of a result of comparing the estimated gap step and the obtained gap step in response to the difference between the estimated gap step and the obtained gap step exceeding a specified range.

8. The system of claim 1, wherein the first information obtaining device is configured to obtain an image and the depth information of a region of the first vehicle body.

9. The system of claim 1, wherein:

the first driving control value corresponds to a mounting state of the first moving part and the second moving part in which the gap step does not occur; and the second driving control value corresponds to a state in which the first moving part and the second moving part are to be mounted in order to adjust the gap step generated while the first moving part and the second moving part are mounted.

10. The system of claim 1, wherein the control device is further configured to obtain the second driving control value based on an algorithm that repeats parallel and rotational movements of the first moving part or the second moving part identified through the first image.

11. A method of operating a system for adjusting a gap step, the method comprising:

controlling a process device based on a first driving control value such that a first moving part and a second moving part are mounted on a first vehicle body;

obtaining a first image of the first vehicle body on which the first moving part and the second moving part are mounted;

obtaining the gap step for the first moving part, the second moving part, or both through the first image;

mounting the first moving part and the second moving part on a second vehicle body by controlling the process device based on a second driving control value corresponding to the gap step;

calculating a first measurement value for the first moving part and the second moving part through image analysis;

converting depth information about the first vehicle body into plane information, when calculating the first measurement value;

obtaining the second driving control value for the process device based on the first measurement value; and calculating a second measurement value for the first moving part and the second moving part through image analysis, wherein:

the first measurement value is a measurement value for a gap step difference generated between the first moving part and the second moving part mounted on the first vehicle body, the second measurement value corresponds to the gap step difference corrected by the second driving control value, the first vehicle body is a vehicle body before being introduced into a painting process after the first moving part and the second moving part are mounted through a vehicle body assembly process, and the second vehicle body is the vehicle body that is introduced into the process device controlled based on the second driving control value.

12. The method of claim 11, wherein controlling the process device comprises:

obtaining vehicle type information of the first vehicle body, the vehicle type information comprising model information, specification information, production date information, or production order information; and controlling the process device based on the first driving control value corresponding to the obtained vehicle type information.

13. The method of claim 12, wherein obtaining of the first image comprises obtaining the first image based on a measurement location corresponding to the vehicle type information.

14. The method of claim 11, further comprising:

mounting the first moving part on the first vehicle body introduced into a first process device;

mounting the second moving part on the first vehicle body discharged through the first process device and introduced into a second process device; and obtaining the first image of the first vehicle body discharged through the second process device.

15. The method of claim 11, further comprising:

estimating the gap step for the second vehicle body based on the second driving control value;

obtaining the gap step for the first moving part, the second moving part, or both through a second image of the second vehicle body discharged from the process device; and verifying accuracy of the second driving control value based on the estimated gap step and the obtained gap step.

16. The method of claim 15, further comprising controlling the process device based on a third driving control value corresponding to the gap step obtained through the second image in response to a difference between the estimated gap step and the obtained gap step exceeding a specified range.

17. The method of claim 15, further comprising notifying an external device of a result of comparing the estimated gap step and the obtained gap step in response to the difference between the estimated gap step and the obtained gap step exceeding a specified range.

18. The method of claim 11, wherein the first image comprises an image and the depth information of a region of the first vehicle body.

19. The method of claim 11, wherein:

the first driving control value corresponds to a mounting state of the first moving part and the second moving part in which the gap step does not occur; and the second driving control value corresponds to a state in which the first moving part and the second moving part are to be mounted in order to adjust the gap step generated while the first moving part and the second moving part are mounted.

20. The method of claim 11, wherein the second driving control value is obtained based on an algorithm that repeats at least parallel and rotational movements of the first moving part or the second moving part identified through the first image.

* * * * *